(12) United States Patent
Taniguchi

(10) Patent No.: US 9,660,226 B2
(45) Date of Patent: May 23, 2017

(54) PACKAGING MATERIAL FOR LITHIUM-ION BATTERY

(71) Applicant: Toppan Printing Co., Ltd., Taito-ku, Tokyo (JP)

(72) Inventor: Tomoaki Taniguchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 53 days.

(21) Appl. No.: 14/489,271

(22) Filed: Sep. 17, 2014

(65) Prior Publication Data

US 2015/0017518 A1 Jan. 15, 2015

Related U.S. Application Data

(63) Continuation of application No. PCT/JP2013/058055, filed on Mar. 21, 2013.

(30) Foreign Application Priority Data

Mar. 21, 2012 (JP) ................................. 2012-063713

(51) Int. Cl.
*H01M 2/02* (2006.01)
*B32B 15/08* (2006.01)
(Continued)

(52) U.S. Cl.
CPC ............. *H01M 2/0287* (2013.01); *B32B 7/12* (2013.01); *B32B 15/08* (2013.01); *B32B 15/20* (2013.01);
(Continued)

(58) Field of Classification Search
CPC ..... B32B 15/08; B32B 15/20; B32B 2255/06; B32B 2255/26; B32B 2274/00;
(Continued)

(56) References Cited

U.S. PATENT DOCUMENTS 6,261,019 B1 7/2001 Furukawa
2003/0180609 A1* 9/2003 Yamashita ............ H01M 2/021
429/185
2013/0149597 A1 6/2013 Suzuta et al.

FOREIGN PATENT DOCUMENTS

EP 1 315 219 A1 5/2003
JP 2002-264215 * 9/2002 ............. B29C 61/06
(Continued)

OTHER PUBLICATIONS

Extended European Search Report dated Oct. 15, 2015 issued in EP13764249.2.
(Continued)

*Primary Examiner* — Patrick Ryan
*Assistant Examiner* — Ben Lewis
(74) *Attorney, Agent, or Firm* — Foley & Lardner LLP

(57) ABSTRACT

A packaging material for lithium-ion battery comprises a substrate layer made of a plastic film, and a first adhesive layer, a metal foil layer, an anti-corrosion layer, a second adhesive layer and a sealant layer successively laminated on one surface of the substrate layer. The plastic film has a water absorption rate of not less than about 01% to not larger than about 3% when determined by a method described in JIS K 7209:2000 and when the plastic film is subjected to a tensile test (wherein the sample of the plastic film is stored for 24 hours in an environment of 23° C. and 40% R.H., and subjected to a tensile test in the same environment as indicated above under conditions of a sample width of 6 mm, a gauge length of 35 mm and a tensile speed of 300 mm/minute), stress values in an MD direction of the sample and in a TD direction of the sample after stretching by about 10% relative to a length of the sample prior to the tensile test are both from not larger than about 110 MPa and at least one
(Continued)

of the stress values in the MD direction of the sample and in the TD direction of the sample is not less than about 70 MPa.

9 Claims, 1 Drawing Sheet

(51) Int. Cl.
| | |
|---|---|
| *B32B 7/12* | (2006.01) |
| *B32B 15/20* | (2006.01) |
| *B32B 27/32* | (2006.01) |
| *B32B 27/36* | (2006.01) |
| *H01M 10/0525* | (2010.01) |

(52) U.S. Cl.
CPC .............. *B32B 27/32* (2013.01); *B32B 27/36* (2013.01); *H01M 2/026* (2013.01); *H01M 2/0277* (2013.01); *H01M 2/0285* (2013.01); B32B 2255/06 (2013.01); B32B 2255/26 (2013.01); B32B 2274/00 (2013.01); B32B 2307/54 (2013.01); B32B 2307/714 (2013.01); B32B 2457/10 (2013.01); B32B 2553/00 (2013.01); H01M 10/0525 (2013.01); H01M 2002/0297 (2013.01); H01M 2220/30 (2013.01)

(58) Field of Classification Search
CPC .......... B32B 2307/54; B32B 2307/714; B32B 2457/10; B32B 2553/00; B32B 27/32; B32B 27/36; B32B 7/12; H01M 10/0525; H01M 2002/0297; H01M 2220/30; H01M 2/026

See application file for complete search history.

(56) References Cited

FOREIGN PATENT DOCUMENTS

| | | | |
|---|---|---|---|
| JP | 2002-264215 | A | 9/2002 |
| JP | 3567230 | B2 | 9/2004 |
| JP | 2005-026152 | A | 1/2005 |
| JP | 2005-093315 | A | 4/2005 |
| JP | 4559547 | B2 | 10/2010 |
| JP | 2011-060501 | A | 3/2011 |
| JP | 2011-076735 | A | 4/2011 |
| JP | 2011-187385 | A | 9/2011 |
| JP | 2011-216390 | A | 10/2011 |
| JP | 2012-203985 | A | 10/2012 |
| WO | WO-99/33670 | A1 | 7/1999 |
| WO | WO-2012/029826 | A1 | 3/2012 |
| WO | WO-2012/033133 | A1 | 3/2012 |
| WO | WO-2012/153847 | A1 | 11/2012 |

OTHER PUBLICATIONS

International Search Report dated Jun. 11, 2013 issued in Application No. PCT/JP2013/058055.
First Office Action for Chinese Patent Application No. 201380014319.3 mailed Mar. 16, 2016.
Second Office Action for Chinese Patent Application No. 201380014319.3 mailed Nov. 3, 2016.

* cited by examiner

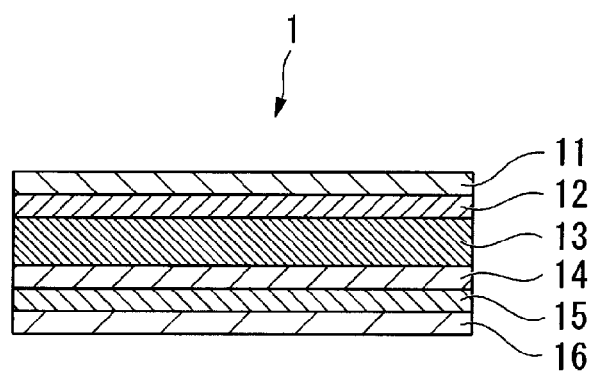

PACKAGING MATERIAL FOR LITHIUM-ION BATTERY

This application is a continuation of application filed under 35 U.S.C. 111(a) claiming the benefit under 35 U.S.C. §§120 and 365(c) of PCT International Application No. PCT/JP2013/058055 filed on Mar. 21, 2013, which is based upon and claims the benefit of priority of Japanese Application No. 2012-063713 filed on Mar. 21, 2012, the entire contents of which are hereby incorporated by reference in their entireties.

TECHNICAL FIELD

This invention relates to a packaging material for lithium-ion batteries.

BACKGROUND ART

For secondary batteries, miniaturization is essential because of miniaturization of mobile devices and limitation on installation space. To this end, attention has been paid to lithium-ion batteries with a high energy density. Although metal cans have been hitherto used as a packaging material for lithium-ion batteries (hereinafter simply called "packaging material"), multi-layered films which are lightweight, high in heat radiation and low in costs have been in use.

However, lithium salts such as $LiPF_6$, $LiBF_4$ and the like are used as an electrolyte of lithium-ion batteries. These lithium salts generate hydrofluoric acid by hydrolysis. Hydrofluoric acid may sometimes cause corrosion on the metal surface of battery members and a lowering of laminate strength between adjacent layers of a packaging material formed of a multilayer film.

To avoid this, an aluminum foil layer is disposed inside of a packaging material made of a multilayer film so as to inhibit moisture infiltration into the battery from the surface of the packaging material. For instance, a known packaging material includes, as successively stacked, a substrate layer having a heat resistance/first adhesive layer/aluminum foil layer/anti-corrosion layer/second adhesive layer/sealant layer. The lithium-ion battery making use of the above packaging material is called an aluminum-laminated type lithium-ion battery.

For an aluminum-laminated type lithium-ion battery, there is known, for example, an embossed lithium-ion battery wherein part of a packaging material is formed with a recess by cold forming, and a battery body (including a cathode, a separator, an anode, an electrolytic solution, etc.) is accommodated in the recess, and a remaining portion of the packaging material is folded back and sealed along its marginal portion by heat-sealing. In recent years, a lithium-ion battery has been fabricated wherein two sheathing sheets to be bonded together are, respectively, formed with a recess for the purpose of increasing an energy density and thus, more battery bodies can be accommodated.

The energy density of a lithium-ion battery becomes higher as the recess formed by cold forming is made deeper. However, a deeper recess is more prone to causing pinholes or breakage in a packaging material at the time of the forming.

Accordingly, a biaxially stretched polyamide film having excellent formability has been in wide use as a substrate layer. Since the biaxially stretched polyamide film is not well resistant to an electrolytic solution, a laminate film wherein a biaxially stretched polyester film is laminated on the biaxially stretched polyamide film has been used as a substrate layer (e.g. Patent Literature 1).

Use of a film as a substrate layer whose rates of elongation in four directions of 0°, 45°, 90° and 135° relative to the MD direction (flow direction) are, respectively, not less than 80% has been proposed (Patent Literature 2).

CITATION LIST

Patent Literature

[PTL 1]: Japanese Patent Publication No. 4559547
[PTL 2]: Japanese Patent Publication No. 3567230

SUMMARY OF INVENTION

Technical Problem

However, with a packaging material making use, as a substrate layer, either the above-mentioned biaxially stretched polyamide film or a laminate film of the biaxially stretched polyester film and the biaxially stretched polyamide film, satisfactory formability cannot be obtained because of the humidity environment under which forming is carried out.

With a film whose rates of stretching (a ratio of an increment to the original length of the substrate layer when the substrate layer is stretched) along the four directions are each not less than 80%, satisfactory formability may not be obtained because of the humidity environment where forming is carried out.

The invention has for its object the provision of a packaging material for lithium-ion battery which allows for improved or even excellent formability irrespective of the environmental humidity.

Solution to Problem

The packaging material for lithium-ion batteries according to an embodiment of the invention includes a substrate layer made of a plastic film, and a first adhesive layer, a metal foil layer, an anti-corrosion layer, a second adhesive layer and a sealant layer successively laminated on one surface of the substrate layer, wherein the plastic film has a water absorption rate of from not less than about 0.1% to not larger than about 3% when determined by a test described in JIS K 7209:2000, and when a sample of the plastic film is stretched, according to the following tensile test, by about 10% relative to a length of the sample prior to the tensile test, a stress value in an MD direction of the sample and a stress value in a TD direction of the sample are both at not larger than about 110 MPa, and at least one of the stress value in the MD direction of the sample and the stress value in the TD direction of the sample is not less than about 70 MPa:

(Tensile Test)

Here is how the tensile test can be performed: The sample is stored for 24 hours in an environment of 23° C. and 40% R.H., and subjected to a tensile test in an environment of 23° C. and 40% R.H., under conditions of a sample width of 6 mm, a gauge length of 35 mm and a tension speed of 300 mm/second to measure a stress value at the time when the sample is stretched by about 10% (displacement: 3.5 mm) relative to a length of the sample prior to the test.

In one embodiment of the invention, it is preferred that when the sample is stretched by about 10% relative to a length of the sample prior to the tensile test according to the tensile test of the plastic film, the stress value in the MD direction of the sample and the stress value in the TD direction are both at not less than about 70 MPa to not larger than about 110 MPa.

In an embodiment of the invention, the plastic film is preferably made of a 10-40 μm thick polyethylene terephthalate film.

In an embodiment of the invention, the plastic film preferably contains not less than 2 mass % to not larger than 30 mass % of a thermoplastic polyester elastomer.

Advantageous Effects of Invention

The packaging material for lithium-ion battery of the invention exhibits improved or even excellent formability irrespective of humidity environment

BRIEF DESCRIPTION OF DRAWINGS

FIG. 1 is a sectional view showing a packaging material for lithium-ion battery of the invention.

DESCRIPTION OF EMBODIMENTS

An example of a packaging material for lithium-ion battery of the invention is described based on FIG. 1

A packaging material 1 for lithium-ion battery (hereinafter referred as "packaging material 1) of this embodiment is, as shown in FIG. 1, a laminate having a first adhesive layer 12, a metal foil layer 13, an anti-corrosion layer 14, a second adhesive layer 15 and a sealant layer 12 laminated successively on one surface of a substrate layer 11. The packaging material 1 includes the substrate layer 11 as an outermost layer and the sealant layer 16 as an innermost layer. More particularly, the packaging material 1 is used in such a way that the substrate layer 11 is set at an outer side (outer surface) of a battery and the sealant layer 16 is set at an inner side (inner surface) of the battery.

[Substrate Layer 11]

The substrate layer 11 serves to impart a heat resistance in the course of a sealing step when a lithium-ion battery is fabricated and plays a role of inhibiting generation of pinholes which might occur during the course of processing and distribution.

The substrate layer 11 is made of a plastic film (hereinafter referred to as "plastic film A"), which has a water absorption rate of from not less than about 0.1% to not larger than about 3% when determined by a test described in JIS K 7209:2000, and wherein when a sample of the plastic film is stretched, in the following tensile test, by about 10% relative to a length of the sample prior to the tensile test, a stress value in an MD direction of the sample and a stress value in a TD direction of the sample are both at not larger than about 110 MPa, and at least one of the stress value in the MD direction of the sample and the stress value in the TD direction of the sample is not less than about 70 MPa. The substrate layer 11 is made of plastic film (A), so that excellent formability is obtained irrespective of humidity environment, and the resulting packaging material 1 becomes excellent in resistance to electrolytic solution of the substrate layer 11.

[Tensile Test]

The sample of the plastic film (A) is stored for 24 hours in an environment of 23° C. and 40% R.H., and is subjected to a tensile test in an environment of 23° C. and 40% R.H., under conditions of a sample width of 6 mm, a gauge length of 35 mm and a tension speed of 300 mm/second to measure a stress value at the time when the sample is stretched by 10% (displacement: 3.5 mm) relative to a length of the sample prior to the test.

The reasons why the above effects are obtained from the substrate layer 11 being made of the plastic film (A) are considered as follows.

With conventional packaging materials, when cold forming is carried out using the same type of packaging material, formability may differ for every material. In some cases, adequate formability could not be obtained. The applicants have made studies on this problem and, as a result, found that the humidity environment during storage or forming of a packaging material significantly affects the formability of the packaging material. More particularly, it has been found that in order to ensure that a packaging material has excellent formability, the plastic film serving as a substrate layer needs to be in a state where a certain amount of moisture is contained. With lithium-ion batteries, it is usual that an electrolytic solution is charged and sealed in a dry room so as to avoid the reaction between an electrolyte and moisture. However, the humidity environment in the storage or forming process of a packaging material prior to charge of an electrolytic solution has never been severely controlled to provide various conditions. It is considered that with the case of conventional packaging materials, if a humidity at the time of storage or forming process is high, then the substrate layer contains moisture sufficient to obtain excellent formability. Where a humidity at the time of storage or forming process is low, the moisture content in the substrate layer becomes short, so that film characteristics significantly vary thereby lowering formability.

In contrast, the packaging material of the invention has the plastic film (A) serving as a substrate layer satisfies the above-defined conditions of stress values obtained after the plastic film (A) is stretched by about 10% relative to a length of the plastic film (A) prior to the tensile test (i.e. a stress value in the MD direction of the plastic film (A) and a stress value in the TD direction of the plastic film (A) are both not larger than about 110 MPa and at least one of the stress value in the MD direction of the plastic film (A) and a stress value in the TD direction of the plastic film (A) is not less than about 70 MPa). Thus, excellent formability is ensured. Moreover, the plastic film (A) has a water absorption rate of not less than about 0.1% and thus, moisture is adequately secured in the film. In addition, because the absorption rate is not larger than about 3%, the moisture content in the film is unlikely to vary depending on the humidity environment. Thus, the film characteristics of the plastic film (A) are less likely to depend on the humidity environment. In view of this, it is considered that the packaging material of the invention are excellent in formability irrespective of humidity environment.

The water absorption rate of the plastic film (A) is preferably at not less than about 0.5% from the standpoint of increasing flexibility of the plastic film (A) and leading to more excellent formability of the packaging material 1. The water absorption rate of the plastic film (A) is preferably at not larger than about 2% in view of the fact that the formability of the packaging material 1 is unlikely to vary depending on the humidity environment.

With respect to stress values at the time when the plastic film (A) is stretched by about 10% relative to the length of the plastic film (A) prior to the tensile test, it is preferred that a stress value in the MD direction of the plastic film (A) and a stress value in the TD direction of the plastic film are both from not less than about 70 MPa to not larger than about 110 MPa. This permits more excellent formability irrespective of humidity environment.

Further, more preferred stress values in the MD and TD directions of the plastic film (A) are such that the lower limit of the respective stress values of the plastic film (A) being stretched by about 10% relative to the length of the plastic film (A) prior to the tensile test is about 80 MPa. The upper limit of the stress values is more preferably about 100 MPa.

If the stress values are, respectively, not less than the lower limit (about 80 MPa), the packaging material 1 having more excellent formability is obtained. Likewise, if the stress values are, respectively, not larger than the upper limit (about 100 MPa), more excellent formability is imparted to the packaging material 1.

For the plastic film (A), nylon films or polyethylene terephthalate (PET) film is preferred from the standpoint of excellent pierce strength and impact strength. PET film is more preferred as the plastic film (A) in view of its low water absorption rate, a smaller change in film characteristics relative to humidity environment and an excellent resistance to electrolytic solution. Moreover, the plastic film may be any of a uniaxially film, a biaxially film and a non-stretched film, of which a biaxially stretched film is preferred.

The plastic film (A) may be either a single-layer film or a multilayer film. In view of the advantage of costs, the single layer film is preferred. Where the plastic film (A) is made of a multilayer film, the multilayer film should be one which satisfies the requirements for the above-indicated absorption rate and also for the stress values of the plastic film when the film is stretched by about 10% relative to the length of the plastic film prior to the tensile test (i.e. both a stress value in the MD direction of the plastic film (A) and a stress value in the TI) direction of the plastic film (A) are not larger than about 110 MPa and at least one of the stress values in the MD and TD directions of the plastic film (A) is not less than about 70 MPa). It will be noted that the multilayer film may include a single substrate obtained by a multilayer co-extrusion method.

The plastic film (A) should preferably contain a thermoplastic polyester elastomer from the standpoint that more excellent formability is obtained. In particular, a PET film containing a thermoplastic polyester elastomer is preferred.

The thermoplastic polyester elastomer means a polyester elastomer containing a hard segment and a soft segment.

Examples of the hard segment include crystalline polyesters such as polybutylene terephthalate, polybutylene naphthalate, polyethylene terephthalate and the like, of which polybutylene terephthalate is preferred.

Examples of the soft segment include polyoxyalkylene glycols such as polytetramethylene glycol and the like, and polyesters such as polycaprolactone, polybutylene adipate and the like. Of these, polytetramethylene glycol is preferred.

The ratio (by mass) of the soft segment to the hard segment in the thermoplastic polyester elastomer is 1.0-4.0, preferably 1.2-3.2 and more preferably 1.5-2.3. If the ratio is not less than the lower limit (1.0), crystallinity can be kept to ensure a low water absorption rate. If the ratio is not larger than the upper limit (4.0), flexibility can be held.

The content of the thermoplastic polyester elastomer in the plastic film (A) is from not less than 2 mass % to not larger than 30 mass %, more preferably from not less than 5 mass % too 20 mass %. When the content of the thermoplastic polyester elastomer is at the lower limit (2 mass %) or over, the resulting plastic film (A) becomes softened, thus leading to good formability. If the content of the thermoplastic polyester elastomer is at the upper limit (30 mass %) or below, the hardness of the plastic film (A) is held, thereby developing an effect of protecting a metal foil layer 13 during forming.

The thickness of the substrate layer is preferably 10-40 μm, more preferably 20-35 μm. When the thickness is not less than the lower limit (10 μm), excellent formidability is ensured. When the thickness of the substrate layer is not larger than the upper limit (40 μm), the shrinkage force of the substrate layer at a portion where stretched by forming does not become so great that the shape of the packaging material can be held after the forming.

[First Adhesive Layer 12]

The first adhesive layer 12 is one serving to bond the substrate layer 11 and a metal foil layer 13 together.

The adhesive for the first adhesive layer 12 is preferably made of a two-component curing urethane adhesive comprised of a main agent such as of a polyester polyol, a polyether polyol, an acrylic polyol or the like and a curing agent such as of a bifunctional or higher functional aromatic or aliphatic isocyanate compound.

When the urethane adhesive is aged, for example, at 40° C. for four days or over after coating, the reaction between the hydroxyl group of the main agent and the isocyanate group of the curing agent proceeds to enable strong adhesion.

The thickness of the first adhesive layer is preferably 1-10 μm, more preferably 3-7 μm from the standpoint of adhesion strength and processability or so as to keep followability (even though a member on which the first adhesive layer 12 is deformed or shrunk, the adhesive layer 12 is reliably formed on the member without being peeled off).

[Metal Foil Layer 13]

For the metal foil layer 13, a variety of metal foils such as of aluminum, stainless steels and the like can be used. From the standpoint of processabilities, such as of a moisture-proof property, ductility and the like, and costs, an aluminum foil is preferred. Ordinary soft aluminum foils can be used as an aluminum foil. Among them, an iron-containing aluminum foil is preferred because of the excellence in pinhole resistance and ductility during forming.

The content of iron in the iron-containing aluminum foil (100 mass % in total) is preferably at 0.1-9.0 mass %, more preferably at 0.5-2.0 mass %. If the content of iron is not less than the lower limit (0.1 mass %), the resulting packaging material 1 becomes excellent in pinhole resistance and ductility. When the content of iron is not larger than the upper limit (9.0 mass %), the packaging material 1 has excellent flexibility.

The thickness of the metal foil layer 13 is preferably at 9-200 μm, more preferably at 15-100 μm in view of barrier properties, pinhole resistance and processability.

[Anti-Corrosion Layer 14]

The anti-corrosion layer 14 serves to inhibit corrosion of the metal foil layer 13 with hydrofluoric acid generated by means of an electrolytic solution or by reaction between an electrolytic solution and water. The layer 14 also acts to enhance a force of adhesion between the metal foil layer 13 and the adhesive layer 15.

The anti-corrosion layer 14 is preferably formed of a film which is formed by coating or immersion of an acid-resistant anti-corrosion agent. Such a film has an excellent anti-corrosive effect of the metal foil layer against an acid. In addition, the metal foil layer 13 and the second adhesive layer 15 are more strongly bonded together by the anchor effect and thus, a tolerance against an electrolytic solution or the like contents is obtained.

As such a film, mention is made, for example, of a film formed by ceriasol treatment with an anti-corrosion agent made of cerium oxide, a phosphate salt and various types of thermosetting resins, or by chromate treatment with an anti-corrosion agent made of a chromate salt, a phosphate salt, a fluoride and various types of thermosetting resins.

It will be noted that the anti-corrosion layer 14 may not be limited to the above-mentioned films, but other types of films may also be used provided that they ensure a satisfactory corrosion resistance against the metal foil layer. For instance, those films formed by a phosphate treatment, a boehmite treatment and the like may be used.

The anti-corrosion layer may be a single layer or plural layers. Additives such as a silane coupling agent may be added to the anti-corrosion layer 14.

The thickness of the anti-corrosion layer 14 is preferably at 10 nm-5 μm, more preferably at 20 nm-500 nm from the standpoint of the anti-corrosive and anchoring functions.

[Second Adhesive Layer 15]

The second adhesive layer 15 is one used for adhesion between the metal foil layer 13 on which the anti-corrosion layer 14 has been formed and a sealant layer 16. The packaging material 1 is broadly classified into a thermal laminate arrangement and a dry laminate arrangement depending on the type of adhesive component forming the second adhesive layer 14.

The adhesive component forming the second adhesive layer 15 in the thermal laminate arrangement preferably includes acid-modified polyolefin resins wherein polyolefin resins are modified with an acid such as maleic anhydride. Because the acid-modified polyolefin resin has a polar group introduced partially into a non-polar polyolefin resin, it can tightly adhere to both a non-polar sealant layer 16 formed such as of a polyolefin plastic film and the polar anti-corrosion layer 14. The use of the acid-modified polyolefin resin leads to an improved tolerance against contents such as of an electrolytic solution. Hence, if hydrochloric acid generates inside the battery, it is likely to prevent the lowering of adhesion force between the anti-corrosion layer 14 and the sealant layer 16 due to the degradation of the second adhesive layer 15.

The acid-modified polyolefin resins used as the second adhesive layer may be used singly or in combination of two or more.

As a polyolefin resin used for the acid-modified polyolefin resin, mention is made, for example, of low density, medium density or high density polyethylene, ethylene-α-olefin copolymers, homo, block or random polypropylene, and propylene-α-olefin copolymers. Alternatively, there may be used copolymers obtained by copolymerizing the above-indicated compounds with a polar compound such as acrylic acid or methacrylic acid, polymers such as crosslinking polyolefins and the like.

The acid modifying the polyolefin resins include a carboxylic acid, an epoxy compound, an acid anhydride or the like. Maleic anhydride is preferred.

The adhesive component for the second adhesive layer 15 for use in thermal laminate arrangement is preferably made of a maleic anhydride-modified polyolefin resin obtained by graft modification of a polyolefin resin with maleic anhydride, more preferably a maleic anhydride-modified polypropylene, from the standpoint of the ease in keeping the adhesion between the sealant layer 16 and the metal foil layer 13 in case where an electrolytic solution comes to infiltration.

The rate of modification with maleic anhydride in respect of maleic anhydride-modified polypropylene (i.e. a weight of the site derived from maleic anhydride relative to the total weight of maleic anhydride-modified polypropylene) is preferably 0.1-20 wt %, more preferably 0.3-5 wt %.

The second adhesive layer having a thermal laminate arrangement preferably contains a styrene or olefin-based elastomer. In doing so, it is expected that it is likely to inhibit the whitening of the packaging material due to the cracks in the second adhesive layer 15 during cold forming and that the adhesion force between the anti-corrosion layer 14 and the sealant layer 16 is improved by increase of wettability, and the film-forming property of the second adhesive layer 15 is also improved by reduction of anisotropy. These elastomers should preferably be dispersed in or miscible with the acid-modified polyolefin resin on the order of nanometers (size in nanometer).

The melt flow rate (MFR) of the adhesive component of the second adhesive layer 15 having a thermal laminate arrangement is preferably at 4-30 g/10 minutes under conditions of 230° C. and 2.16 kgf.

The thickness of the second adhesive layer 15 having a thermal laminate arrangement is preferably 2-50 μm.

For the adhesive component of the second adhesive layer 15 having a dry laminate arrangement includes, for example, a two-component curing polyurethane adhesive like the compound mentioned with respect to the first adhesive layer 12.

The second adhesive layer 15 having a dry laminate arrangement has a bonding site susceptible to hydrolysis, such as an ester group, a urethane group or the like, for which the second adhesive layer 15 having a thermal laminate arrangement is preferred for more reliable applications.

[Sealant Layer 16]

The sealant layer 16 is one imparting sealability to the packaging material by heat sealing.

For the sealant layer 16, mention is made of those films of resins such as polyolefin resin, an acid-modified polyolefin resin wherein a polyolefin resin is graft-modified with an acid such as maleic anhydride.

Examples of the polyolefin resin include low density, medium density or high density polyethylene, ethylene-α-olefin copolymers, homo, block or random polypropylene, propylene-α-olefin copolymers, and the like. These polyolefin resins may be used on their own or in combination of two or more.

The acid-modified polyolefin resin may be, for example, a resin similar to one mentioned with respect to the second adhesive layer 15.

The sealant layer 16 may be a single-layer film or a multilayer film and should be chosen depending on the necessary function. For instance, in order to impart a moisture proof property, there can be used a multilayer film making use of a resin such as an ethylene-cyclic olefin copolymer or polyethylpentene.

The sealant layer 16 may be further formulated with various types of additives such as a flame retardant, a slip agent, an anti-blocking agent, an antioxidant, a light stabilizer, a tackifier and the like. The thickness of the sealant layer 16 is preferably at 10-100 μm, more preferably at 20-60 μm.

Although the packaging material may be one wherein the sealant layer 16 is laminated on the second adhesive layer 15 by dry lamination, it is preferred in view of improving adhesiveness that the second adhesive layer 15 is formed on an acid-modified polyolefin resin and the sealant layer is laminated on the second adhesive layer by sandwich lamination.

[Fabrication Method]

A method for fabricating the packaging material 1 is now described. In this regard, however, the method for fabricating the packaging material 1 should not be construed as limited to the method set out below.

For the method for fabricating the packaging material 1, a method having the following steps (1)-(3) is mentioned, for example.

Step of forming a metal foil layer 13 on an anti-corrosion layer 14.

Step of attaching a substrate layer 11 via a first adhesive layer 12 to a surface of the metal foil layer 13 opposite to a surface on which the anti-corrosion layer has been formed.

Step of attaching a sealant layer 16 via a second adhesive layer 15 on the surface of the metal oil layer 13 on which the anti-corrosion layer 14 has been formed.

(Step (1))

An anti-corrosion agent is coated onto one surface of a metal foil layer 13 and dried to form an anti-corrosion layer 14. Examples of the anti-corrosion agent include such an anti-corrosion agent for ceriasol treatment and an anti-corrosion agent for chromate treatment as mentioned before.

The manner of coating of the anti-corrosion agent is not critical and various methods can be adopted including gravure coating, reverse coating, roll coating, bar coating and the like.

(Step (2))

Using an adhesive for forming a first adhesive layer 12, plastic film (A) forming a substrate layer 11 is attached to a surface of the metal foil layer 13 opposite to a surface, on which the anti-corrosion layer has been formed, according to a procedure such as of dry lamination.

In the step (2), aging may be carried out within a range of room temperature-100° C. in order to promote the adhesion.

(Step (3))

With the case of a thermal laminate arrangement, the surface of the anti-corrosion layer of a laminate including, for example, the substrate layer 11, first adhesive layer 12, metal foil layer 13 and anti-corrosion layer 14 successively laminated in this order is formed thereon with a second adhesive layer 15 according to an extrusion lamination process, followed by attaching a film for a sealant layer 16 thereto. The lamination of the sealant layer 16 on the second adhesive layer is preferably carried out by sandwich lamination.

With the dry laminate arrangement, for example, a film for the sealant layer 16 is laminated, by use of such an adhesive as mentioned above, via the second adhesive layer 15 on a surface, on which the anti-corrosion layer 14 of the laminate has been formed, according to a procedure such as of dry lamination, non-solvent lamination, wet lamination or the like.

According to the steps (1)-(3) illustrated above, the packaging material 1 is obtained.

It will be noted that the manner of fabricating the packaging material 1 should not be construed as limited to the method wherein the above steps (1)-(3) are successively carried out. For instance, the step (1) may performed after completion of the step (2).

The lithium-ion battery using the packaging material of the invention can be fabricated according to known procedures except that the packaging material of the invention is used. For example, the battery can be obtained in the following manner. The packaging material of the invention is formed with a recess by cold forming at a part thereof. A cathode, a separator and an anode are placed in the recess, after which another sheet of the packaging material is overlaid so as to allow sealant layers to be faced each other, followed by heat sealing the three sides of the outer periphery of the overlaid sheathing sheets. Thereafter, an electrolytic solution is charged from the remaining one side of the packaging materials. The sheathing sheets at the remaining one side are overlaid and hermetically sealed by heat sealing to obtain a lithium-ion battery.

It will be noted that the lithium-ion battery making use of the packaging material of the invention is not limited to one fabricated by the above method.

EXAMPLES

The invention is described in detail by way of examples, which should not be construed as limiting the invention thereto.

[Materials Used]

(Substrate Layer 11)

Substrate A-1: biaxially stretched PET film (containing 8 mass % of a thermoplastic polyester elastomer with a thickness of 25 μm)

Substrate A-2: biaxially stretched PET film (containing 16 mass % of a thermoplastic polyester elastomer with a thickness of 25 μm)

Substrate A-3: biaxially stretched PET film (containing 1 mass % of a thermoplastic polyester elastomer with a thickness of 25 μm)

Substrate A-4: biaxially stretched nylon 6 film (with a thickness of 25 μm)

As to the substrate A-4, a rate of elongation in the TD direction of the plastic film (an increasing ratio relative to the length of the substrate film when the substrate film was stretched) was measured under conditions of a sample width of substrate A-4 of 15 mm, a gauge length of 50 mm and a tensile speed of 100 mm/second, revealing that the ratio was 75% (i.e. the substrate A-4 was elongated to 175%).

(First Adhesive Layer 12)

Adhesive B-1: urethane adhesive (commercial name "A525/A50", manufactured by Mitsui Chemicals Polyurethanes, Inc.)

(Metal Foil Layer 13)

Metal foil C-1: soft aluminum foil 8079 material (with a thickness of 40 μm, manufactured by Toyo Aluminium K.K.

(Anti-Corrosion Layer 14)

Treating agent D-1: coating-type treating agent for ceriasol treatment mainly comprised of cerium oxide, phosphoric acid and an acrylic resin (Second Adhesive Layer 15)

Adhesive resin E-1: polypropylene resin graft-modified with maleic anhydride (commercial name "Adomer", manufactured by Mitsui Chemicals Inc.

(Sealant Layer 16)

Film F-1: film subjected to corona treatment on an inner surface of non-stretched polypropylene film (with a thickness of 40 μm)

[Fabrication of Packaging Material]

The treating agent D-1 was coated onto one surface of the metal foil C-1 serving as a metal foil layer 13 and dried to form an ant-corrosion layer 14. Next, any of the substrates A-1 to A-4 was attached to a surface of the metal foil layer 13 opposite to the anti-corrosion layer 14 according to a dry lamination method using the adhesive B-1 to laminate a substrate layer 11 through the first adhesive layer 12. Subsequently, the resulting packaging material was aged at 60° C. for 6 days. The anti-corrosion layer 14 of the resulting laminate was formed thereon with a second adhesive layer 15 by extrusion of the adhesive resin E-1 by means of an extruder, followed by further attachment of the film F-1 by sandwich lamination to form a sealant layer 16. Thereafter, the resulting laminate was thermally compressed under conditions of 160° C., 4 kg/cm² and 2 m/minute to provide a packaging material.

[Evaluation of Water Absorption Rate]

The respective films used as the substrate layer 11 were subjected to a test, based on JIS K 7209:2000, to measure a water absorption rate and were classified according to the following standards.

Water absorption rate G-1: the rate is not less than 0.1% to not larger than 3%.

Water absorption rate G-2: The rate is large than 3%.

[Tensile Strength Evaluation]

The respective plastic films used for the substrate layer were stored in an environment of 23° C. and 40% R.H., for 24 hours and subjected to a tensile test (using a sample width of the substrate layer of 6 mm, a gauge length of 35 mm and a tensile speed of 300 mm/minute) in an environment of 23° C. and 40% R.H. Stress values of the plastic films in both the MD and TD directions of the films, which were obtained by stretching by 10% (displacement: 3.5 mm) relative to the length of the plastic film prior to the tensile test, were measured and classified according to the following standards.

Stress value H-1: the stress values in the MD and TD directions of a plastic film are both at not less than 70 MPa to not larger than 110 MPa.

Stress value H-2: one of the stress values in the MD and TD directions of a plastic film is at not less than 70 MPa to not larger than 110 MPa and the other stress value is not larger than 70 MPa.

Stress value H-3: the stress values in the MD and TD direction of a plastic film are both at not less than 70 MPa to not larger than 110 MPa.

"Good": the degree of quality degradation on the layer surface is at not larger than about 10% of the contact area of the electrolytic solution.

"Bad": the degree of quality degradation on the layer surface exceeds about 10% of the contact area of the electrolytic solution.

[Evaluation of Formability]

The packaging materials obtained in the respective examples were each cut into a blank (plane in shape) having 150 mm×190 mm and stored for 24 hours in an environment of 23° C. and 40% R.H., followed by subjecting to cold forming in an environment of 23° C. and 40% R.H., while changing the forming depth to evaluate formability. In addition, formability was also evaluated under the same conditions as used above except that the storing (24 hours) and forming environments used were a dew-point temperature of −35° C. (temperature: 23° C.).

A punch used was a mold having a shape of 100 mm×150 mm, a punch corner R(RCP) of 1.5 mm, a punch shoulder R(RP) of 0.75 mm, and a die shoulder R of 0.75 mm. The evaluation was accorded to the following standards.

"Excellent": deep drawing to a depth of not smaller than 7 mm is possible without causing breakage and cracking of the packaging material.

"Good": deep drawing to a depth of not smaller than 5 mm to smaller than 7 mm is possible without causing breakage and cracking of the packaging material.

"Bad": when deep drawing is carried out to a depth smaller than 5 mm, the packaging material is broken or cracked.

Examples 1, 2 and Comparative Examples 1, 2

According to the procedure set out before, packaging materials having substrate layer arrangements indicated in Table 1 were made. The results of the evaluation of the resistance to electrolytic solution and formability are shown in Table 1.

TABLE 1

| | Substrate layer 11 | | | | | | | Formability | |
|---|---|---|---|---|---|---|---|---|---|
| | | Water absorption rate | | Stress value when stretched by about 10% | | | | | 23° C., |
| | | | | MD direction | TD Direction | | Resistance to electrolytic | 23° C., 50% | dew point temperature |
| | Kind | Measured value | Classification | [MPa] | [MPa] | Classification | solution | R.H. | of −35° C. |
| Example 1 | A-1 | 1 | G-1 | 90 | 95 | H-1 | Excellent | Excellent | Excellent |
| Example 2 | A-2 | 2 | G-1 | 65 | 75 | H-2 | Excellent | Good | Good |
| Comp. Ex. 1 | A-3 | 1.5 | G-1 | 115 | 105 | H-3 | Excellent | Bad | Bad |
| Comp. Ex. 2 | A-4 | 4 | G-2 | 85 | 95 | H-1 | Bad | Excellent | Bad |

[Evaluation of Resistance to Electrolytic Solution]

An electrolytic solution was dropped in several drops onto a surface of the substrate layer of individual packaging materials obtained in the examples and allowed to stand for 24 hours in an environment of 25° C. and 65% R.H., after which the electrolytic solution was wiped off and how the surface of the substrate layer was changed was visually observed. The evaluation was accorded to the following standards.

"Excellent": no quality degradation is observed on the surface of the substrate layer.

As shown in Table 1, the water absorption rates of the plastic films are from not less than about 0.1% to not larger than about 3%. Using the substrate layers of the plastic films whose stress values in the MD and TD directions of the plastic films are both not less than about 110 MPa and wherein at least one of the stress values in the MD and TD directions of the plastic films is not less than about 70 MPa when stretched by about 10% relative to the length of the plastic film prior to the tensile strength, the packaging materials of Examples 1, 2 showed excellent formability without suffering the influence of the storing and forming environments. Especially, in Example 1 using the substrate layer made of the plastic film whose stress values in the MD and TD directions of the plastic film are both from not less than about 70 MPa to not larger than about 110 MPa when stretched by about 10% relative to the length of the plastic film prior to the tensile test, more excellent formability was shown. The packaging materials of Examples 1 and 2 were excellent in the resistance to electrolytic solution of the substrate layer.

On the other hand, with the packaging material of Comparative Example 1 wherein although the water absorption rate of the plastic film was at not less than about 0.1% to not larger than about 3%, at least one of the stress values in the MD and TD directions of the plastic film was larger than about 110 MPa when stretched by about 10% relative to the length of the plastic film prior to the tensile test, satisfactory formability in either environment of 40% R.H., and a dew-point temperature of −35° C. could not be obtained.

Further, with the packaging material of Comparative Example 2 wherein although the stress values of the plastic film in the MD and TD directions are both from not less than about 70 MPa to not larger than about 110 MPa when stretched by about 10% relative to the length of the plastic film prior to the tensile test, the water absorption rate was larger than about 3%, it was found that the elongation rate (i.e. an increasing rate relative to the original length of the base material before stretching) in the TD direction is less than 80%, excellent formability was shown in a humidity environment of 40% R.H. However, the packaging material of Comparative Example 2 was not satisfactory with respect o the formability in such a humidity environment as of a dew-point temperature of −35° C. This is considered for the following reason: the water absorption rate of the plastic film in the packaging material of Comparative Example 2 is at 4%, so that the moisture content in the film is liable to vary. In an environment of a low humidity at a dew-point temperature of −35° C., the moisture in the plastic film for the substrate layer evaporates and becomes short, with the result that the film characteristics are changed.

REFERENCE LIST

1 . . . packaging material for lithium-ion battery, 11 . . . substrate layer, 12 . . . first adhesive layer, 13 . . . metal foil layer, 14 . . . anti-corrosion layer, 15 . . . second adhesive layer, 16 . . . sealant layer

What is claimed is:

1. A packaging material for a lithium-ion battery comprising:
    a substrate layer made of a plastic film,
    a first adhesive layer,
    a metal foil layer,
    an anti-corrosion layer,
    a second adhesive layer, and
    a sealant layer successively laminated on one surface of the substrate layer,
    wherein the plastic film has a water absorption rate of not less than about 0.1% to not larger than about 3% when subjected to a test described in JIS K 7209:2000, and when subjected to tensile testing, the plastic film having a stress value in a machine direction and a stress value in a transverse direction both not larger than about 110 MPa, and at least one of the stress value in the machine direction of the sample or the stress value in the transverse direction being not less than about 70 MPa, wherein, prior to the tensile testing, a sample of the plastic film is stored for 24 hours in an environment of 23° C. and 40% relative humidity, and subjected to the tensile testing in an environment of 23° C. and 40% relative humidity under conditions of a sample width of 6 mm, a gauge length of 35 mm and a tensile speed of 300 mm/second to measure a stress value at a time when the sample is stretched by about 10% (a displacement of 3.5 mm) relative to a length of the sample prior to the tensile testing,
    wherein the plastic film contains not less than about 2 mass % to about 30 mass % of a thermoplastic polyester elastomer.

2. The packaging material for the lithium-ion battery of claim 1, wherein when the sample is stretched, according to the tensile testing of the plastic film, by about 10% relative to the length of the sample prior to the tensile testing, stress values in the machine direction of the sample and in the transverse direction of the sample are both from not less than about 70 MPa to not larger than about 110 MPa.

3. The packaging material for the lithium-ion battery of claim 1, wherein the plastic film is made of a polyethylene terephthalate film having a thickness of about 10-40 μm.

4. The packaging material for the lithium-ion battery of claim 1, wherein the thermoplastic polyester elastomer comprises a first segment and a second segment, a mass ratio of the first segment to the second segment being 1.0-4.0.

5. The packaging material for the lithium-ion battery of claim 1, wherein the plastic film is a multi-layer plastic film.

6. The packaging material for the lithium-ion battery of claim 1, wherein the first adhesive layer is formed by a curing agent comprising an isocyanate compound.

7. The packaging material for the lithium-ion battery of claim 1, wherein the second adhesive layer comprises polypropylene resin which is graft-modified with maleic anhydride.

8. The packaging material for the lithium-ion battery of claim 1, wherein the sealant layer comprises polyolefin resin which is graft-modified with maleic anhydride.

9. A lithium-ion battery comprising the packaging material of claim 1, wherein at least a first sheet of the packaging material is provided with a recess; a cathode, a separator and an anode are placed in the recess; and a second sheet of the packaging material is overlaid over the recess.

* * * * *